(12) United States Patent
Bhaskaran et al.

(10) Patent No.: US 10,209,991 B2
(45) Date of Patent: Feb. 19, 2019

(54) INSTRUCTION SET AND MICRO-ARCHITECTURE SUPPORTING ASYNCHRONOUS MEMORY ACCESS

(71) Applicants: Advanced Micro Devices, Inc., Sunnyvale, CA (US); ATI Technologies ULC, Markham (CA)

(72) Inventors: Meenakshi Sundaram Bhaskaran, San Diego, CA (US); Elliot H. Mednick, Salem, NH (US); David A. Roberts, Wellesley, MA (US); Anthony Asaro, Toronto (CA); Amin Farmahini-Farahani, Santa Clara, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 139 days.

(21) Appl. No.: 15/353,161

(22) Filed: Nov. 16, 2016

(65) Prior Publication Data
US 2017/0212760 A1    Jul. 27, 2017

Related U.S. Application Data

(60) Provisional application No. 62/281,610, filed on Jan. 21, 2016.

(51) Int. Cl.
*G06F 9/30* (2018.01)
*G06F 9/38* (2018.01)
(Continued)

(52) U.S. Cl.
CPC ........ *G06F 9/30043* (2013.01); *G06F 9/3005* (2013.01); *G06F 9/3016* (2013.01);
(Continued)

(58) Field of Classification Search
CPC .......................... G06F 9/30043; G06F 9/3005
See application file for complete search history.

(56) References Cited

U.S. PATENT DOCUMENTS 5,878,245 A * 3/1999 Johnson .............. G06F 9/30043
  711/131
6,212,622 B1 4/2001 Witt
(Continued)

OTHER PUBLICATIONS

Belli et al., "Notified Access: Extending Remote Memory Access Programming Models for Producer-Consumer Synchronization", 2015 IEEE International Parallel and Distributed Processing Symposium, May 25-29, 2015, pp. 871-881, http://unixer.de/publications/img/notified-access-extending-rma.pdf. [Retrieved Aug. 24, 2018].
(Continued)

*Primary Examiner* — Benjamin P Geib
(74) *Attorney, Agent, or Firm* — Meyertons Hood Kivlin Kowert and Goetzel PC; Rory D. Rankin (57) ABSTRACT

A system and method for reducing latencies of main memory data accesses are described. A non-blocking load (NBLD) instruction identifies an address of requested data and a subroutine. The subroutine includes instructions dependent on the requested data. A processing unit verifies that address translations are available for both the address and the subroutine. The processing unit continues processing instructions with no stalls caused by younger-in-program-order instructions waiting for the requested data. The non-blocking load unit performs a cache coherent data read request on behalf of the NBLD instruction and requests that the processing unit perform an asynchronous jump to the subroutine upon return of the requested data from lower-level memory.

17 Claims, 5 Drawing Sheets

(51) Int. Cl.
G06F 12/084 (2016.01)
G06F 12/0862 (2016.01)
G06F 12/0875 (2016.01)
G06F 12/1027 (2016.01)

(52) U.S. Cl.
CPC .......... *G06F 9/3802* (2013.01); *G06F 12/084* (2013.01); *G06F 12/0862* (2013.01); *G06F 12/0875* (2013.01); *G06F 12/1027* (2013.01); *G06F 2212/1024* (2013.01); *G06F 2212/452* (2013.01); *G06F 2212/6028* (2013.01)

(56) References Cited

U.S. PATENT DOCUMENTS

| | | | |
|---|---|---|---|
| 2015/0268960 A1* | 9/2015 | Knox | G06F 9/30101 712/220 |
| 2016/0246723 A1* | 8/2016 | Doshi | G06F 12/0811 |

OTHER PUBLICATIONS

Danalis et al., "Gravel: A Communication Library to Fast Path MPI", Proceedings of the 15th European PVM/MPI Users' Group Meeting on Recent Advances in Parallel Virtual Machine and Message Passing Interface, Sep. 2008, pp. 111-119, https://www.researchgate.net/publication/221597529/download. [Retrieved Sep. 1, 2018].

Malicevic et al., "Exploiting NVM in Large-scale Graph Analytics", Proceedings of the 3rd Workshop on Interactions of NVM/Flash with Operating Systems and Workloads, Oct. 4, 2015, pp. 1-9, http://citeseerx.ist.psu.edu/viewdoc/download?doi=10.1.1.899.7101&rep=rep1&type=pdf. [Retrieved Aug. 24, 2018].

Suzuki et al., "The Non-Volatile Memory Technology Database (NVMDB)", UCSC-CSE Technical Report No. CS2015-1011, May 2015, pp. 1-5, https://cseweb.ucsd.edu/~swanson/papers/TR2015-NVMDB.pdf. [Retrieved Aug. 24, 2018].

Vishnu et al., "Building Scalable PGAS Communication Subsystem on Blue Gene/Q",2013 IEEE International Symposium on Parallel & Distributed Processing, Workshops and Phd Forum, 2013, pp. 825-833, http://hpc.pnl.gov/people/vishnu/public/vishnu_cass13.pdf. [Retrieved Aug. 24, 2018].

Zhang et al., "Mojim: A Reliable and Highly-Available Non-Volatile Memory System", Proceedings of the Twentieth International Conference on Architectural Support for Programming Languages and Operating Systems, Mar. 14, 2015, pp. 3-18, http://cseweb.ucsd.edu/~yiyingzhang/mojim-asplos15.pdf. [Retrieved Aug. 24, 2018].

* cited by examiner

INSTRUCTION SET AND MICRO-ARCHITECTURE SUPPORTING ASYNCHRONOUS MEMORY ACCESS

CROSS REFERENCE TO RELATED APPLICATIONS

This application claims priority to Provisional Patent Application Ser. No. 62/281,610, entitled "Instruction Set and Micro-architecture Supporting Asynchronous Memory Access", filed Jan. 21, 2016, the entirety of which is incorporated herein by reference.

BACKGROUND

Computing systems use a relatively large amount of low-cost main memory as the next level of a memory hierarchy after smaller, faster and more expensive cache memories. The main memory is typically dynamic random-access memory (DRAM) that stores each bit of data in a separate capacitor within an integrated circuit. Although the DRAM uses a different storage technology than the static random access memory (SRAM) used for the cache memories, each of the SRAM and the DRAM includes volatile memory. Volatile memory maintains data for as long as power is applied. In order to support systems where the power can be removed for extended periods of time, or where the constant power requirement for DRAM conflicts with low-power mechanisms in the system, a combination of RAM and read only memory (ROM) is used.

In contrast to using a combination of RAM and ROM, non-volatile memory (NVM) is sometimes used. Non-volatile memory technologies include resistive random access memory (ReRAM) and phase-change random access memory (PRAM), and provide byte addressable access to non-volatile memory. The non-volatile memory provides better scalability and lower cost compared to DRAM at much lower idle power. System developers are able to attach the non-volatile memory directly to the processor memory bus and allow applications to directly access the non-volatile memory through load and store instructions (read and write operations). However, as the density of the non-volatile memory increases, the latencies for the read and write operations increase significantly. The increase in latency for the non-volatile memory results in cache misses, which in turn adds a significant number of clock cycles to the completion of load instructions. In some cases, the cache accesses take thousands of clock cycles to retrieve the desired data from the non-volatile memory. In such cases, system performance degrades below the performance of comparable systems using only DRAM as main memory.

In view of the above, efficient methods and systems for reducing latencies of main memory data accesses are desired.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Systems and methods for reducing latencies of memory data accesses are contemplated. In various embodiments, a computing system includes a processing unit and a non-blocking load unit. The processing unit supports processing non-blocking load instructions which include an identification of requested data and instructions that operated upon the data. In various embodiments, the identification is an address of the requested data and an address/pointer to a subroutine including the one or more instructions. The subroutine includes instructions dependent on the requested data. When the processing unit detects the non-blocking load instruction, it reads the operands used to generate the address and the pointer and verifies address translations are available for the address and the pointer. After successful verification, the processing unit sends corresponding information to the non-blocking load unit. This information includes the address, the pointer and a unique application specific identifier (ASID) distinguishing the subroutine from other subroutines of other non-blocking load instructions. The processing unit then continues processing instructions following the non-blocking load instruction with no stalls caused by younger-in-program-order instructions that are waiting for the requested data.

The non-blocking load unit stores the received information in an array and later generates a data read request on behalf of the non-blocking load instruction. The non-blocking load unit sends the data read request to lower-level memory via a cache controller to ensure the data read request is a cache coherent read access. In various embodiments, the lower-level memory is non-volatile memory. When the non-blocking load unit detects the requested data has returned from the lower-level memory, it sends the pointer to the processing unit for fetching the subroutine. The processing unit performs an asynchronous branch (jump) to the subroutine after verifying the received ASID of the pointer is the same as an ASID of a current process.

Figure 1:
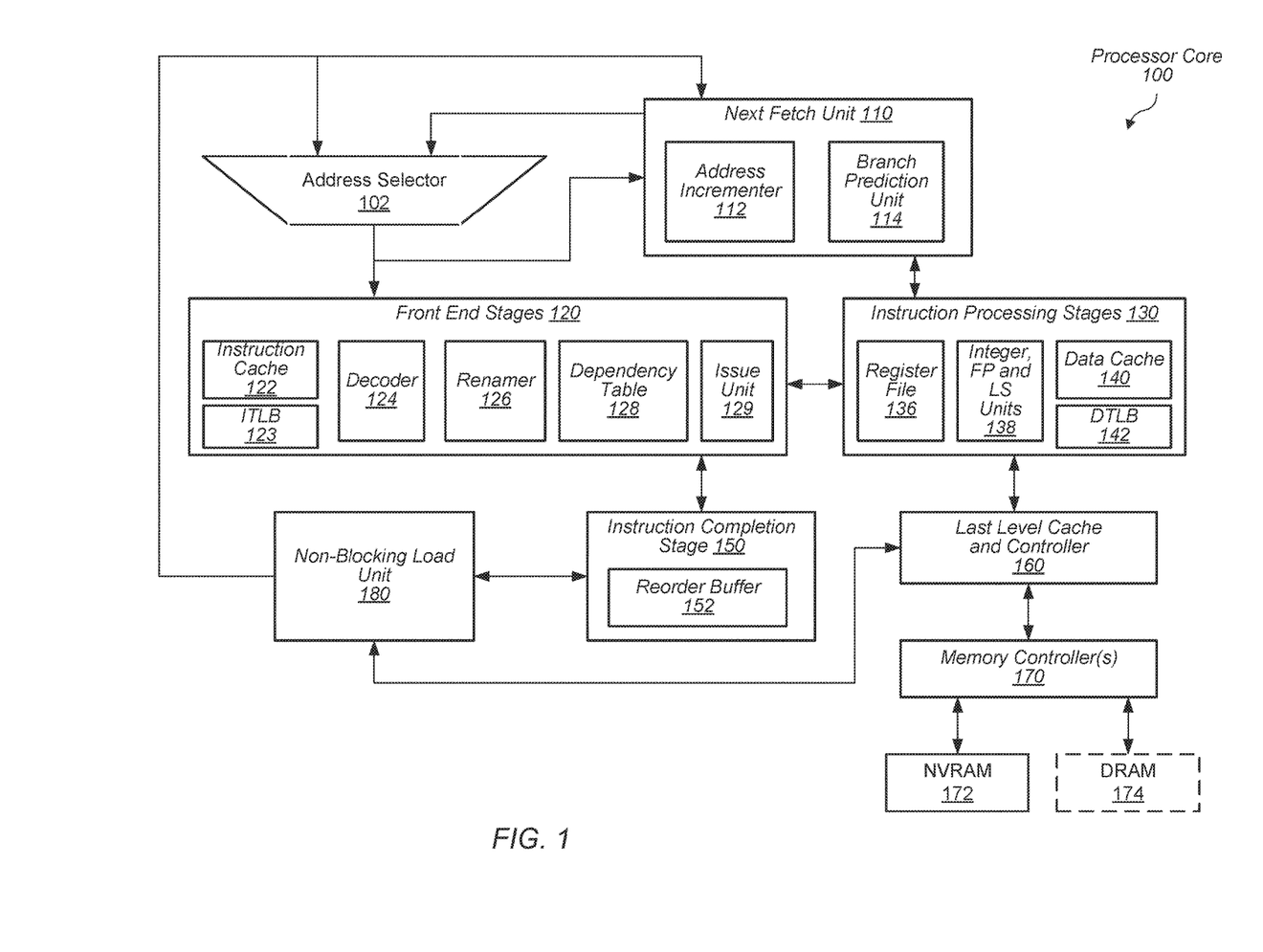
FIG. 1 is a generalized diagram of one embodiment of a general-purpose processing unit.

Turning to FIG. 1, a generalized block diagram of one embodiment of a general-purpose processing unit 100 that performs out-of-order execution is shown. The processing unit 100 includes an address selector 102, a next fetch unit 110, front end stages 120, instruction processing stages 130 and instruction completion stage 150. Distributed control logic is used by the processing unit 100 throughout the units and pipeline stages. The processing unit 100 also includes a last level cache and controller 160, which is a shared cache memory subsystem. The memory controllers 170 include one or more controllers and interface logic to access data in main memory. The main memory includes at least non-volatile random access memory (NVRAM) 172. The main memory also includes dynamic random access memory (DRAM) 174. For example, the processing unit 100 uses a hybrid main memory scheme. Further, the processing unit 100 includes a non-blocking load unit 180 for supporting event-driven read operations for data in the NVRAM 172. In various embodiments, the processing unit 100 does not stall the processing of any instructions in a computer program following the event-driven read operation.

The front end stages 120 include an instruction cache 122 and corresponding instruction translation lookaside buffer (ITLB) 123. The instruction cache 122 stores instructions for one or more software applications. The ITLB 123 stores addresses in order to access the instructions. The processing unit 100 includes a program counter (not shown) that holds a pointer to an address of the next instructions to fetch in the instruction cache. The address incrementer 112 increments the value stored in the program counter each clock cycle. The program counter is one or multiple inputs for the address selector 102. The address selector 102 also receives a predicted address from the branch prediction unit 114, which predicts an outcome of a conditional instruction prior to an execution unit determining the actual outcome in a later pipeline stage. Control logic in the next fetch unit 110 determines which input should be selected by the address selector 102. Multiple instructions are fetched from the instruction cache per clock cycle if there are no cache misses.

The address output from the address selector 102 is compared to addresses in the ITLB 123. The processing unit 100 uses an address translation scheme allowing one or more virtual address spaces to be made visible to executing software. Memory accesses within the virtual address space are translated to a physical address space corresponding to the actual physical memory available to the processing unit 100. The instruction cache 122 is partially or completely addressed using physical address bits rather than virtual address bits. For example, in one embodiment, the instruction cache 122 uses virtual address bits for cache indexing and physical address bits for cache tags. In order to avoid the cost of performing a full memory translation when performing a cache access, the processing unit 100 stores a set of recent and/or frequently used virtual-to-physical address translations in the ITLB 123.

The front end stages 120 also include a decoder 124 and a renamer 126. The decoder 124 decodes the opcodes of the multiple fetched instructions and allocates entries in an in-order retirement queue such as the reorder buffer 152 of the instruction completion stage 150. The flow of instructions from the decoder 124 to the allocation of entries in the renamer 126 is referred to as dispatch. The renamer 126 performs register renaming for the fetched instructions. The renamer 126 uses the current data dependencies found in the dependency table 128 to perform the register renaming. Once decoded and renamed, instructions are ready to be scheduled for execution. The issue unit 129 acts as a scheduler with an instruction queue where instructions wait until their operands become available. When operands are available and hardware resources are also available, an instruction is issued out-of-order from the issue unit 129 to the instruction processing stages 130.

The instruction processing stages 130 include units 138. The units 138 include one or more integer and floating-point (FP) units 138 for performing computational calculations such as Boolean arithmetic, addition, subtraction, multiplication, division, and square root. The units 138 also include a load/store unit which stores read and write operations. The load/store unit includes queues and logic to execute memory access instructions. Also, verification logic resides in the load/store unit to ensure a load instruction received forwarded data, or bypass data, from the correct youngest store instruction.

The memory access instructions stored in the load/store unit access the data cache 140 and data translation lookaside buffer (DTLB) 142. The data cache 140 stores data used in computations performed by the instructions. Similar to the ITLB 123, the DTLB 142 also stores frequently used virtual-to-physical address translations. Results from the units 138 are presented on a common data bus and sent to the reorder buffer 152. Here, a given instruction that receives its results is marked for retirement. When the given instruction is also at the head-of-the-queue within the reorder buffer 152, its results are sent to the register file 136. The register file 136 holds the architectural state of the general-purpose registers of processing unit 100. In one embodiment, the register file 136 contains 32 32-bit registers. Then the instruction in the reorder buffer is retired in-order and its head-of-queue pointer is adjusted to the subsequent instruction in program order.

The results on the common data bus are sent to the issue unit 129 in order to forward values to operands of instructions waiting for the results. When these waiting instructions have values for their operands and hardware resources are available to execute the instructions, they are issued out-of-order from the issue unit 129 to the appropriate resources in the units 138. Results on the common data bus are also routed to the next fetch unit 110 in order to update control flow prediction information and/or the program counter.

In various embodiments, each of the instruction cache 122 and the data cache 140 represents level one (L1) and level two (L2) cache structures. Each of the instruction cache 122 and the data cache 140 share the last level cache and controller 160. In various embodiments, the cache 160 is implemented as an L3 cache structure. Alternatively, each of the instruction cache 122 and the data cache 140 represent an L1 cache structure and the last level cache 160 is an L2 cache structure. In various other embodiments, other combinations are possible.

Generally speaking, each of the caches 122, 140 and 160 stores one or more blocks, each of which is a copy of data stored at a corresponding address in the system memory such as the NVRAM 172. In some embodiments, the processing unit also includes DRAM 174. As used herein, a "block" is a set of bytes stored in contiguous memory locations, which are treated as a unit for coherency purposes. In some embodiments, a block is also the unit of allocation and deallocation in a cache. The number of bytes in a block is varied according to design choice, and is of any size. As an example, 32 byte and 64 byte blocks are often used. In various embodiments, the processing unit 100 is in a multi-core system and multiple copies of a given memory block exist in multiple caches of multiple processors. Accordingly, cache coherency circuitry is included in a cache controller or the memory controllers 170. Each of the caches 122, 140 and 160 has a cache memory coupled to a corresponding cache controller.

In various embodiments, a given block is stored in one or more of the caches 122, 140 and 160 and external caches in other processing units, and since it is possible for one of the cached copies to be modified with respect to the copy in the NVRAM 172 or the DRAM 174, cache coherency is maintained between these caches and the NVRAM 172 or the DRAM 174. Coherency is maintained if an update to a block is reflected by other cache copies of the block according to a predefined coherency protocol. Various specific coherency protocols are well known. One example is the MOESI protocol which uses the modified, owned, exclusive, shared and invalid states.

In various embodiments, the memory access instructions processed in the processing unit 100 include a non-blocking load (NBLD) load instruction. The NBLD instruction can also be referred to as an asynchronous instruction. During processing of the NBLD instruction, the processing unit 100 avoids stalls caused by data dependent younger-in-program-order instructions waiting for the requested data to return from the caches 140 and 160 or from the NVRAM 172. In addition, the processing unit 100 processes the NBLD instruction without intervention from the operating system. Rather, upon retrieving the requested data for the NBLD instruction, the processing unit 100 branches to a subroutine indicated by the NBLD instruction. The instructions within the subroutine include data dependent younger-in-program-order instructions waiting for the data requested by the NBLD instruction. During retrieval of the requested data, the processing unit 100 continues processing other instructions of the software application.

In various embodiments, the decoder 124 detects the NBLD instruction among instructions fetched from the instruction cache 122. For example, the opcode indicates a given instruction is the NBLD instruction. Alternatively, predecode bits indicate the given instruction is the NBLD instruction. For example, in some embodiments, the NBLD instruction and other instructions are decoded prior to being placed in the instruction cache 122. The resulting predecode bits are stored with the instructions in the instruction cache 122. In various embodiments, the decode logic used for predecoding instructions is also included in the decoder 124. The NBLD instruction indicates both an address of requested data and a pointer to a subroutine. The processing unit 100 obtains values for the operands of the NBLD instruction from stored values in the register file 136, from results provided in bypass/forwarding paths, or from results provided on the common data bus.

After obtaining the operands of the NBLD instruction, the processing unit 100 verifies the translation and permission information of these operands. In some embodiments, the NBLD instruction is used in multi-threaded or asynchronous computer programs. Generally, as is understood by those skilled in the art, logic associated with a permission model is used for multi-threaded computer programs. When the operands are retrieved for the detected NBLD instruction, the permissions of the operands as well as the translations are verified. As the NBLD instruction is a memory access instruction, it is issued to the load/store unit of the units 138. The operands being verified for the data request are used to determine the address of the data request. To verify the permission and the translation of the data request address, the load/store unit accesses the DTLB 142. In various embodiments, the load/store unit accesses each DTLB of each level of the cache memory hierarchy. Each level of the cache hierarchy is searched in a serial or parallel manner.

The operands being verified for the subroutine are used to determine the (function) pointer of the subroutine. To verify the permission and the translation of the subroutine function pointer, the load/store unit accesses the ITLB 123. In various embodiments, the lookup operations into the ITLB 123 and the DTLB 142 are performed concurrently. If a TLB entry is not present for either of the address of the data request or the function pointer of the subroutine, then exception handling is initiated which performs page table walks to find the missing address translation mapping and send it to the appropriate TLB. When verification is successful for the detected NBLD instruction, the processor 100 commits the NBLD instruction. The processing unit 100 commits the NBLD instruction by allocating an entry in the non-blocking load unit 180 for the NBLD instruction. In various embodiments, the processing unit 100 fills the entry with at least indications of the address of the data request, the function pointer of the subroutine, and a handle. The handle provides a unique identifier which identifies which load result data corresponds to which NBLD instruction still having a subroutine to process. The processor 100 pushes the handle onto the stack of the software application when the subroutine is later called such as after the NBLD instruction is committed and retired.

The processing unit 100 additionally stores a unique application specific identifier (ASID) in the entry of the non-blocking load unit 180. The ASID is set by the operating system for the currently running processes. This unique identifier is used to guarantee isolation of subroutines from other subroutines of other NBLD instructions. In some embodiments, the subroutine is not called unless the ASID of the subroutine matches the ASID of the current process. The processing unit 100 determines the ASID values match by comparing the values and determining the ASID of the subroutine is the same as the ASID of the current process. Use of the ASID allows sharing of the non-blocking load unit 180 across multiple processes and provides isolation among the multiple processes.

When the entry is allocated and filled in the non-blocking load unit 180 for the detected NBLD instruction, the NBLD instruction is successfully committed. Upon successful commit, the processing unit 100 retires the NBLD instruction. The processing unit 100 continues processing other instructions without stalls caused by data dependent younger-in-program-order instructions waiting for the requested data of the NBLD instruction. These data dependent instructions are not loaded into the processing unit 100 at this time. Rather, these data dependent instructions reside in the user space for the subroutine of the NBLD instruction.

The non-blocking load unit 180 uses the address of the data request of the NBLD instruction to initiate a cache coherent read access on behalf of the NBLD instruction. The non-blocking load unit 180 sends the data read request to the memory controller 170 via the last level cache and controller 160. By sending the data read request via the cache memory hierarchy, the processor 100 ensures the data read request follows the system cache coherency protocol. In addition, the non-blocking load unit 180 is able to detect any changes to address translations or page permissions corresponding to the NBLD instruction. Should any changes be detected, an exception is generated by the non-blocking load unit 180 and the operating system is interrupted to implement existing policy decisions.

In various embodiments, the data read request of the non-blocking load unit 180 is similar to a main memory pre-fetch operation. However, the processing unit 100 enforces cache line allocation and eviction policies as configured by the operating system. In some embodiments, the processing unit 100 transparently re-orders, batches or coalesces the data read requests to the last level cache and controller 160 to ensure consistent memory system performance.

The memory controller 170 includes queues and logic used for routing packets, receiving packets for data processing, and synchronizing the packets to an internal clock used by logic within the processing unit 100. In various embodiments, the memory controller 170 includes separate controllers for the NVRAM 172 and the DRAM 174. The memory controller 170 receives the data read request of the NBLD instruction from the last level cache and controller 160, and later sends this request to the NVRAM 172. In various embodiments, the memory access latency of the NVRAM 172 is significant. In various examples, the memory access latency of the NVRAM 172 reaches 5 to 10 microseconds. However, the processing unit 100 does not stall processing of instructions despite the latency as the younger-in-program-order instructions with a data dependency on the NBLD instruction are placed in a subroutine with a function pointer identified by the NBLD instruction.

When the requested data returns from the NVRAM 172, it is placed in one or more of the caches 140 and 160. In addition, the non-blocking load unit 180 notifies the next fetch unit 110 to perform an asynchronous branch operation using the function pointer of the subroutine. In various embodiments, one or more of the next fetch unit 110 and the front end stages 120 verifies that qualifying conditions are satisfied before performing steps for a branch (jump) operation and a push operation. One condition is the ASID of the NBLD instruction matches the ASID of the current process. Another condition is there is no current interrupt or exception being handled.

When the qualifying conditions are satisfied and the next fetch unit 110 acknowledges the request, the address selector 102 provides the function pointer as the next fetch address to the front end stages 120, which causes a branch (jump) to the subroutine. Additionally, the next fetch unit 110 or the front end stages 120 pushes the corresponding handle onto the application stack. Either the next fetch unit 110 or the front end stages 120 sends a notification to the non-blocking load unit 180 of the successful branch and push operations, and the non-blocking load unit 180 is able to deallocate the corresponding table entry.

Unlike typical instructions, the asynchronous (event-driven) branch (jump) instruction for the subroutine of the NBLD instruction does not contain any speculative state. When the processing unit 100 asynchronously branches to the subroutine, the architectural state that is visible to the application is the same architectural state as if the subroutine was a function call without any arguments. Similar to prologues of any function, the subroutine is responsible for saving and restoring the registers. For example, the prologue typically saves a current value of a stack pointer in a base pointer. In some embodiments, the first instruction of the subroutine saves a register onto the stack and loads the handle from the stack.

While there are no micro-architectural constraints for program correctness, unlike conventional function calls, the software application is responsible for saving and restoring the state of any register the subroutine of the NBLD instruction modifies. In some embodiments, the compiler supports correct program processing of the subroutine. The instructions of the subroutine are processed by the front end stages 120, the instruction processing stages 130 and the instruction completion stage 150. The stages 120, 130 and 150 use the requested data retrieved from NVRAM 172 to process the instructions of the subroutine.

Figure 2:
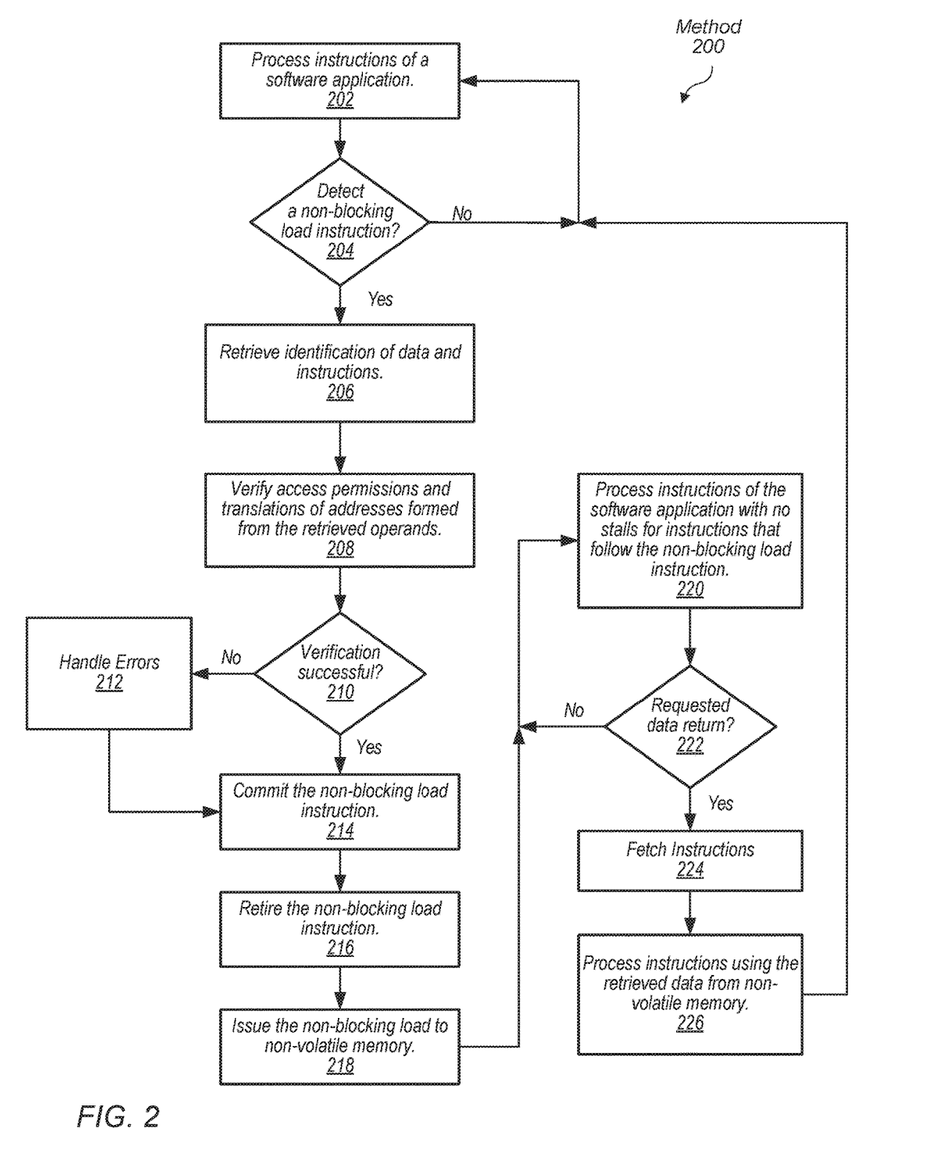
FIG. 2 is a generalized diagram of one embodiment of a method used for reducing latencies of main memory data accesses.

Referring now to FIG. 2, one embodiment of a method 200 for reducing latencies of main memory data accesses is shown. For purposes of discussion, the steps in this embodiment are shown in sequential order. However, in other embodiments some steps occur in a different order than shown, some steps are performed concurrently, some steps are combined with other steps, and some steps are absent.

As shown, instructions of a software application are processed (block 202). In various embodiments, the software application is an event-driven application for large-scale graph applications, key value store database applications, or other large-scale datacenter applications. Processing of the software application generally entails supporting thread creation, thread joining, and maintaining a permission model for the event-driven application.

The software application includes non-blocking load (NBLD) instructions which are also referred to as event-driven or asynchronous load instructions. These NBLD instructions do not stall the processing of younger-in-program-order instructions of the software application. Rather, the younger-in-program-order instructions with a data dependency on the NBLD instruction are placed in a subroutine with a pointer identified by the NBLD instruction. In various embodiments, the NBLD instructions are used to access data stored in a memory (volatile and/or non-volatile) attached to the memory bus of one or more processing units for increased system performance. For example, in various embodiments, the memory is used for relatively large data systems with multiple terabytes of storage attached to the memory bus.

The NBLD instructions identify both an address of requested data and a pointer to a subroutine. The subroutine includes younger-in-program-order instructions dependent on the requested data. As there are no data dependencies in the code, the NBLD instruction does not cause stalls in program execution. If the NBLD load instruction is detected ("yes" branch of the conditional block 204), then operands are retrieved for addresses of the subroutine and the data request (block 206). The operands are retrieved from a register file, result bypass/forwarding paths, or a common data bus with results.

In some embodiments, the NBLD instruction is used in multi-threaded or asynchronous computer programs. These types of computer programs are referred to as event-driven computer programs. The flow of the event-driven computer program is determined by events such as user input actions, sensor output data and messages from other threads or other programs. The event-driven application typically includes a main loop which listens for events. When an event is detected, the application triggers a callback function. Event-driven applications are written in any programming language. Generally, though, the event-driven applications are written in languages that provide high-level abstractions such as closures.

In various embodiments, event-driven applications are used in designing graphical user interfaces (GUIs), large-scale graph applications, key value store database applications, and other large-scale datacenter applications. Generally, logic associated with a permission model is used for multi-threaded computer programs. As dynamic thread creation and joining occurs, a set of logical rules is used for reasoning the correctness of computer programs. As understood by those skilled in the art, separation logic and concurrent separation logic are extensions of Hoare Logic and are used for the reasoning about programs and separate portions of a heap.

In addition to extending the approach in Hoare Logic to apply in the presence of heap-allocated pointers, concurrent separation logic tracks dynamic ownership transfer of heap portions between processes. The permission-based concurrent separation logic associates a unique static access permission with each heap location. The access permissions ensure exclusive write accesses and removes data races. Concurrent read accesses are supported through fractional permissions. Permissions are transferred between threads upon thread starting and thread joining.

In some embodiments, permission information includes a value between the integers 0 and 1. At any point in time, a thread includes permission information for multiple memory locations. When the thread has a value of 1 in the permission information for a given memory location, the thread has permission to modify data stored in the given memory location. When the thread has a fractional value between 0 and 1 in the permission information for the given memory location, the thread has permission to only read data stored in the given memory location. Permission information is split and combined to change between read only and write permissions. The logic of the permission model used, such as the concurrent separation logic, ensures the sum of the permission information for all threads for the given memory location does not exceed 1. This requirement removes data races.

When operands are retrieved for a detected NBLD instruction, the permissions of the operands as well as the translations are verified (block 208). The permissions are verified based on the permission-based separation logic being used. The translations are verified based on the virtual-to-physical mappings being used. In various embodiments, the permissions and the translations are verified for the operands of the data request by accessing the data translation lookaside buffer (DTLB). These operands are used to determine the address of the data request. Additionally, the permissions and the translations are verified for the operands of the subroutine by accessing the instruction translation lookaside buffer (ITLB). These operands are used to determine the function pointer of the subroutine. In various embodiments, the lookup operations into the ITLB and the DTLB are performed concurrently.

If the verifications are unsuccessful, such as a TLB entry is not present for either the address of the data request or the function pointer of the subroutine ("no" branch of the conditional block 210), then the errors are handled (block 212). For example, an exception handler performs page table walks to find the missing one or more mappings and sends them to the appropriate TLB. Afterward, the NBLD instruction is successfully committed (block 214). In various embodiments, the NBLD instruction is committed by allocating an entry in a non-blocking load unit. The corresponding entry is filled with at least indications of the address of the data request, the function pointer of the subroutine, the handle for the subroutine and an application specific identifier (ASID) assigned by the operating system.

When the entry is allocated and filled in the non-blocking load unit for the detected NBLD instruction, the NBLD instruction is successfully committed. Upon successful commit, the NBLD instruction is retired (block 216). Following, a cache coherent data read request is issued on behalf of the NBLD instruction to NVRAM (block 218). In various embodiments, the non-blocking load unit issues the request and uses the address of the data request of the NBLD instruction. The data read request is sent to the memory controller via the last level cache controller to ensure the system cache coherency protocol is followed. In addition, the non-blocking load unit is able to detect any changes to address translations or page permissions corresponding to the NBLD instruction. Should any changes be detected, an exception is generated and the operating system is interrupted to implement existing policy decisions.

While the memory access latency of the NVRAM is relatively significant, the processing of instructions continues with no stalls (block 220). There are no stalls despite the latency as the younger-in-program-order instructions with a data dependency on the NBLD instruction are placed in the subroutine with the function pointer identified by the NBLD instruction. If the requested data returns ("yes" branch of the conditional block 222), then the data is stored in one or more data caches and an asynchronous (event-driven) jump to the subroutine is performed (block 224). The instructions of the subroutine are processed using the requested data retrieved from NVRAM (block 226).

As described above, the NBLD instructions are typically allowed to commit when the verification of the permission information and the address translations are successful. However, for a speculative out-order processor, the NBLD instruction is re-ordered and issued in a similar manner for other load instructions. However, in such cases, no NBLD instruction that issues after a given store instruction is processed until the processing unit resolves the store address. The commit for the NBLD instruction occurs when all the older-in-program-order store instructions with a destination address which matches the request address of the NBLD instruction are no longer in the store queue of the load/store unit.

Figure 3:
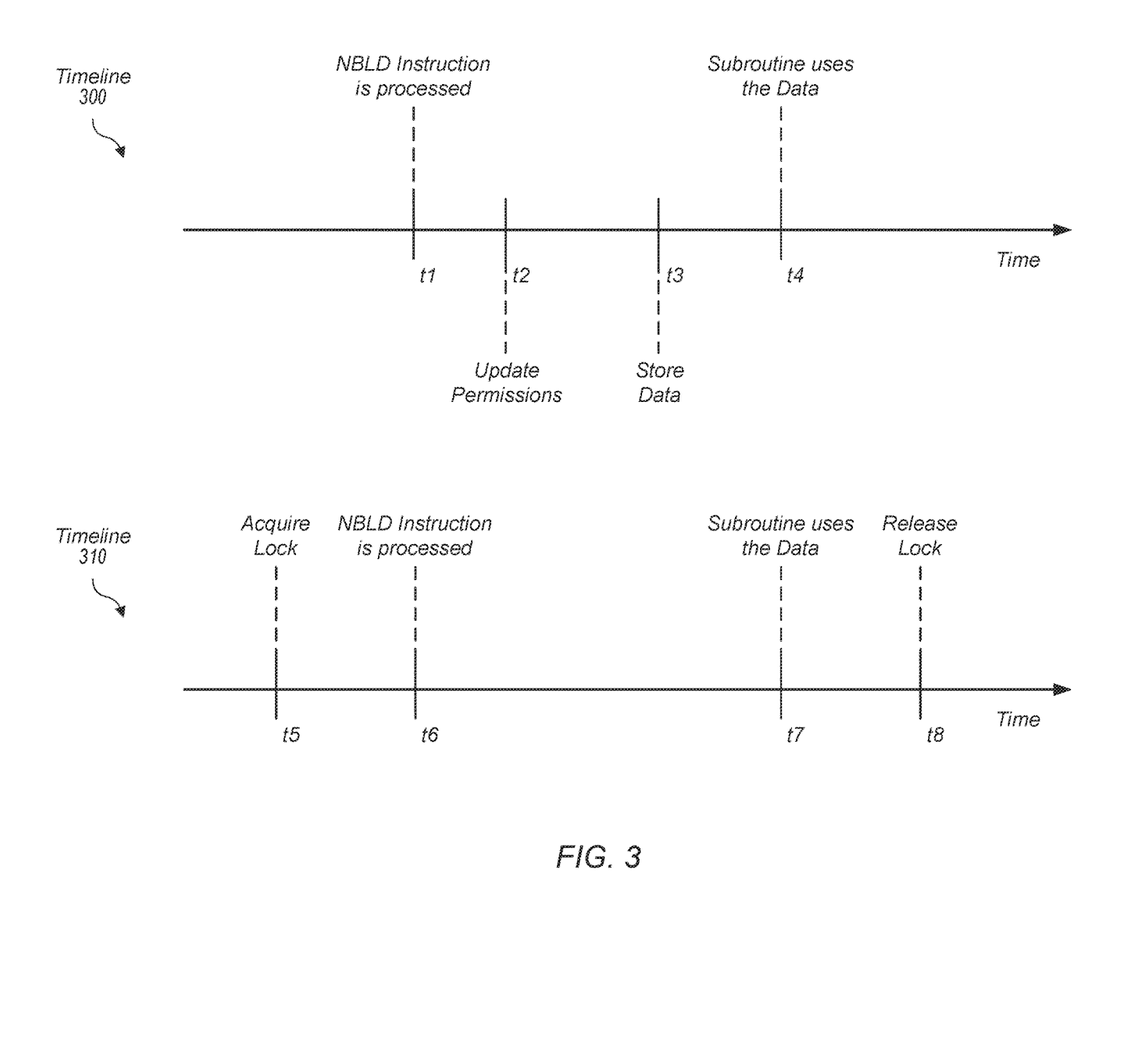
FIG. 3 is a generalized diagram of one embodiment of sequences for using a non-blocking load instruction.

Turning now to FIG. 3, a generalized diagram of one embodiment of sequences for using a non-blocking load (NBLD) instruction is shown. The timeline 300 includes four sequences occurring at times t1 to t4. At time t1, the NBLD instructions are processed. For example, the NBLD instruction is detected, the operands are verified and the asynchronous data read request is sent to memory. At time t2, the permissions corresponding to the requested data are updated. As described earlier, permission-based concurrent separation logic is used to track dynamic ownership transfers of heap portions between processes.

At time t3, the data is updated by one or more write access requests. Finally, at time t4, the subroutine of the NBLD instruction uses the data. An asynchronous branch is performed to jump to the subroutine using its function pointer. The data used by the subroutine is modified by previous permission changes and previous store instructions committed by one or more processing units after the NBLD instruction began processing.

In some embodiments, the software application acquires and uses a lock. For example, in timeline 310 at time t5, the corresponding process acquires a lock for the requested data. At time t6, the NBLD instructions are processed. For example, the NBLD instruction is detected, the operands are verified and the asynchronous data read request is sent to non-volatile memory.

At time t7, an asynchronous branch is performed to jump to the subroutine of the NBLD instruction and uses the data. Both the permissions and the value of the data are unmodified since the lock was previously acquired at time t5. After the subroutine completes, the lock is released at time t8.

Figure 4:
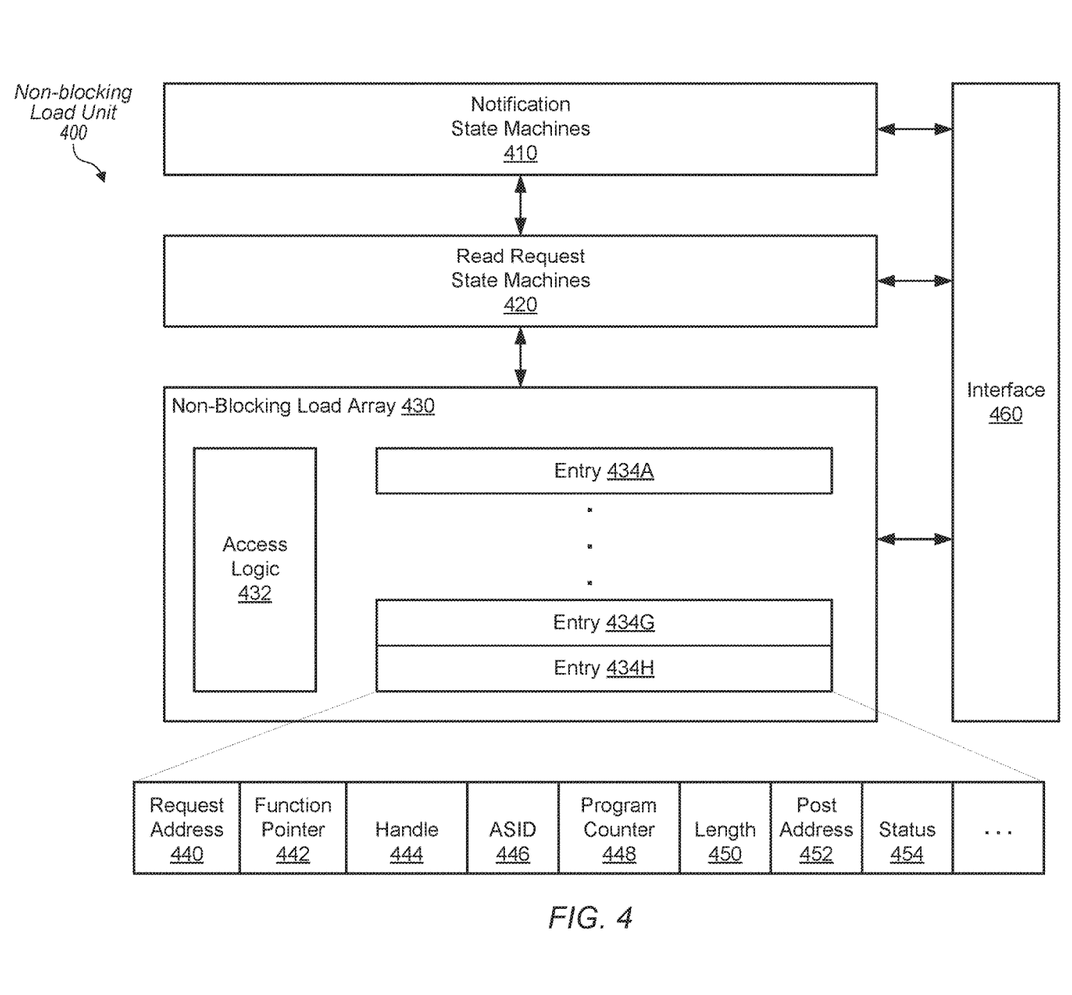
FIG. 4 is a generalized diagram of one embodiment of a non-blocking load unit.

Referring now to FIG. 4, a generalized block diagram of one embodiment of a non-blocking load unit 400 is shown. In the illustrated embodiment, the non-blocking load unit 400 includes notification state machines 410, read request state machines 420, non-blocking load array 430, and interface 450. The non-blocking load unit 400 initiates asynchronous read operations to the memory controller of non-volatile memory, such as NVRAM, on behalf of the corresponding software application. The non-blocking load unit 400 also invokes an asynchronous branch (jump) when the requested data is retrieved from the non-volatile memory and is available. In some embodiments, the non-blocking load unit 400 is used on a per-core basis. However, in other embodiments, the non-blocking load unit 400 is shared among multiple processing units.

The non-blocking load array 430 tracks the NBLD instructions of the software application being processed by a processing unit of one or more processing units. The non-blocking load array 430 includes a data structure with entries 434A-434H. The data structure is one of a first-in-first-out (FIFO) array, a table, a content addressable memory (CAM) structure, a fully-associative storage array, or other. The access logic 432 controls the allocation and deallocation of the entries 434A-434H. In some embodiments, an available entry of the entries 434A-434H is allocated when a NBLD instruction passes verification checks for its operands. An allocated entry is deallocated when the processing unit processing the corresponding NBLD instruction performs an asynchronous branch to the subroutine indicated by the NBLD instruction.

Each of the entries 434A-434H stores multiple fields. As shown, each entry stores fields 440-454. Although a particular number of fields are shown and shown in contiguous order, in other embodiments, a different number of fields are stored and in a different order. The request address field 440 stores the address of the data read request which is sent to non-volatile memory when the requested data is not found in the cache memory subsystem. In various embodiments, the virtual address is stored.

The function pointer field 442 stores the address of the subroutine to asynchronously execute when the requested data is retrieved and available. The subroutine is stored in user space. The handle field 444 stores a unique identifier which indicates which data in the load result buffer corresponds to which NBLD instruction. The ASID field 446 stores a unique identifier used to allow sharing of the non-blocking load array 430 across multiple processes while guaranteeing isolation.

In some embodiments, the function pointer is an offset relative to the program counter value of the NBLD instruction rather than an absolute address value. In such embodiments, where the function pointer is an offset, the program counter field 448 stores the program counter value of the NBLD instruction. The length field 450 stores a number indicating a number of bytes of a vector to retrieve from the non-volatile memory. The length filed 450 is used in cases where the software application accesses vectors. The address stored in the request address field 440 and the number of bytes stored in the length field 450 indicate the vector to retrieve.

The post address field 452 stores an address used to store a message indicating whether the requested data has been retrieved from non-volatile memory. When the processing unit processing the NBLD instruction completes the data read request and retrieves the requested data, the processing unit stores (posts) a corresponding message in the memory location pointed to by the address stored in the post field 452. In various embodiments, the kernel of the operating system allocates pages for messages and sets up the pages as un-cached memory for accesses by both the processing unit and the non-blocking load unit 400. In some embodiments, the user library polls the memory location pointed to by the address stored in the post field 452 for new messages. The status field 454 stores metadata such as a valid indication, age information, priority information and so forth.

The read request state machines 420 are used in combination with the access logic 432 to service the asynchronous load operations with allocated entries in the non-blocking load array 430. Servicing includes selecting a corresponding entry of the entries 434A-434H, generating a data read request, and sending the request to the memory controller of the non-volatile memory via a cache controller. The interface 460 uses supported protocols to send the request to the cache controller. The interface 460 includes arbitration logic for supporting the protocols.

Upon detecting the requested data is retrieved and available, the read request state machines 420 send a notification to the notification state machines 410. The notification state machines 410 generate a post message to store in the memory location pointed to by the address stored in the post address field 452 of the corresponding entry. In some embodiments, the post message includes the function pointer, the data request address and the handle of the NBLD instruction.

In some embodiments, the manufacturer of the one or more processing units which process NBLD instructions defines the size of the non-blocking load array 430. When the number of NBLD instructions being processed exceeds the size of the non-blocking load array 430, an exception is generated and the operating system handles the exception. In other embodiments, the entries 434A-434H reside in DRAM and the read request state machines 420 monitor the current in-flight data read requests to the memory controller of the non-volatile memory. Additionally, the access logic 432 uses physical addresses to access the non-blocking load array 430. The operating system defines the page table structure and handling paging exceptions.

In some embodiments, the non-blocking load unit 430 identifies the destination of the retrieved data of the NBLD instruction. In one embodiment, the non-blocking load unit 430 indicates the requested data is placed in a cache line. The corresponding called subroutine accesses the retrieved data using the same request virtual address identified within the NBLD instruction. In another embodiment, the non-blocking load unit 430 indicates the requested data is placed in a scratchpad memory location pointed to by an address identified by the software application. In yet another embodiment, the non-blocking load unit 430 indicates the requested data is placed in a destination that best suits a current workload. The processing unit identifies through a configuration register the location of the scratchpad memory for storing the retrieved data from the non-volatile memory.

Figure 5:
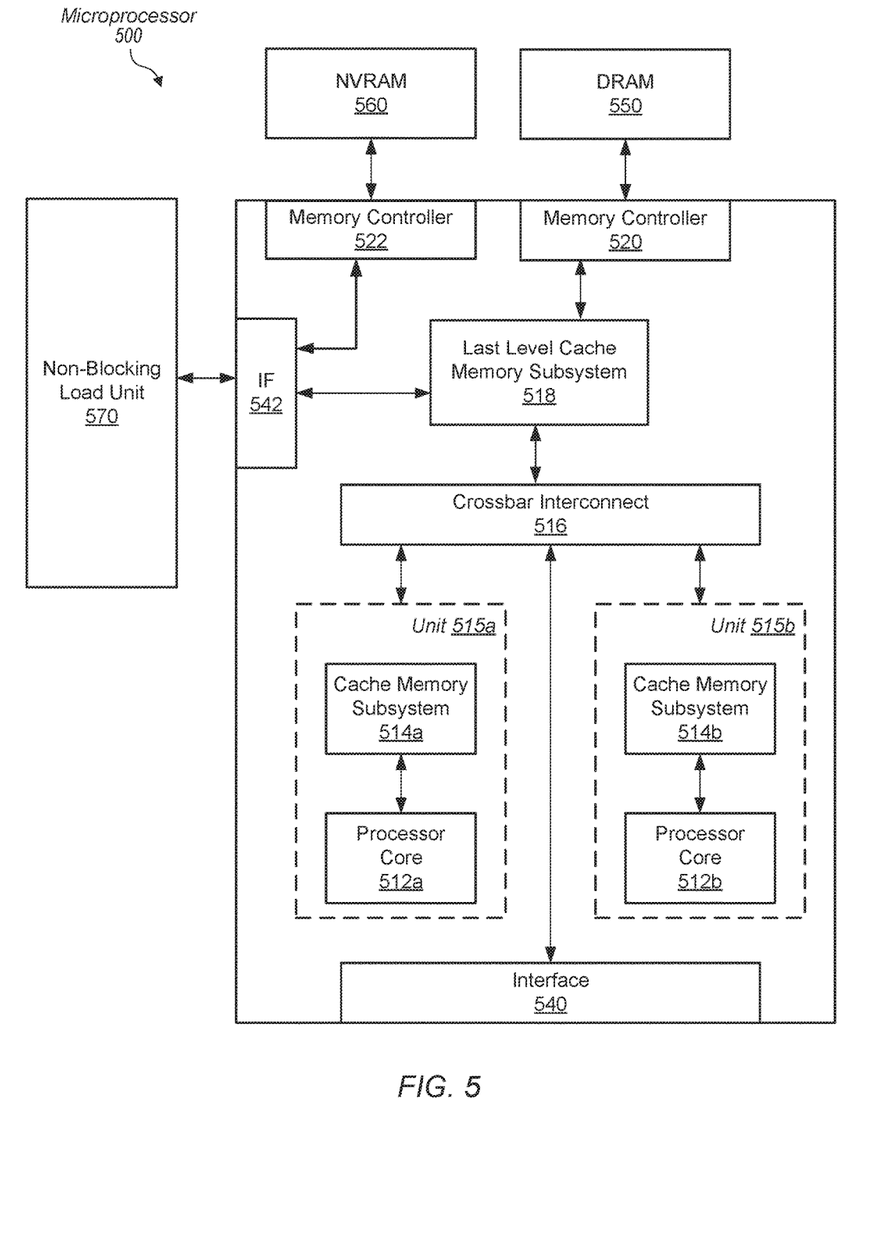
FIG. 5 is a generalized diagram of one embodiment of a microprocessor.

Turning now to FIG. 5, one embodiment of an exemplary microprocessor 500 is shown. In the illustrated embodiment, the microprocessor 500 includes memory controllers 520-522, interface logic 540-542, processing units 515a-515b, crossbar interconnect logic 516, and a shared cache memory subsystem 518. In one embodiment, the illustrated functionality of microprocessor 500 is incorporated upon a single integrated circuit.

Interface 540 provides an interface for input/output (I/O) devices external to the microprocessor 500 to the shared cache memory subsystem 518 and processing units 515. Additionally, interface 540 is used to communicate with other microprocessors and/or other processing nodes. Interface 542 supports protocols for communicating with the non-blocking load unit 570. Microprocessor 500 is coupled to DRAM 550 via the memory controller 520 and coupled to NVRAM 560 via the memory controller 522. The DRAM 550 includes one or more RAMBUS dynamic random access memories (DRAMs), synchronous DRAMs (SDRAMs), DRAM, static RAM, etc. The NVRAM 560 includes include resistive random access memory (ReRAM) and phase-change random access memory (PRAM). The address space of microprocessor 500 is divided among multiple memories. Microprocessor 500 or a respective processing node comprising microprocessor 500 includes a memory map used to determine which addresses are mapped to which memories.

As shown, the processing units 512a-512b provide a homogeneous design as the processing units 512a and 512b are the same designs. For example, the processing units 512a-512b include similar circuitry for executing instructions according to a predefined general-purpose instruction set. For example, in various embodiments, the x86 instruction set architecture is selected. Alternatively, the Alpha, PowerPC, or any other general-purpose instruction set architecture is selected. In other embodiments, the processing units 512a-512b provide a heterogeneous design as the processing units 512a and 512b are different designs. For example, the processing core 512a is a general-purpose processing unit and the processing core 512b uses a highly parallel microarchitecture used for graphics processing units (GPUs), digital signal processors (DSPs) and so forth. In either a homogeneous design or a heterogeneous design, the one or more processing units in the microprocessor 500 share the non-blocking load unit 570.

Each of the processing units 515a-515b include corresponding cache memory subsystems 514a-514b for data and instructions. The non-blocking load unit 570 is used when either of the processing units 515a-515b detects a NBLD instruction. One or more identifiers of the processing units 515-515b and the processing cores 512a-512b are used in allocated entries of a non-blocking load array within the non-blocking load unit 570. These identifiers are used in order to identify the source processing the corresponding NBLD instruction. The non-blocking load unit 570 additionally services NBLD instructions on other microprocessors through a network interface included in the interface 540.

Generally speaking, crossbar interconnect logic 516 responds to received control packets received from the interfaces 540 and 542, to generate control packets in response to processing units 512a-512b and/or cache memory subsystems 514a-514b, to generate probe commands and response packets in response to transactions selected by the memory controllers 520-522 for service, and to route packets for an intermediate node. Crossbar interconnect 516 conveys memory requests from processing units 512a-512b to shared cache memory subsystem 518 or to memory controllers 520-522. Also, crossbar interconnect 516 conveys received memory lines and control signals from DRAM 550 and NVRAM 560 via memory controllers 520-522 to processing units 512a-512b and caches memory subsystems 514a-514b and 518. Interconnect bus implementations between crossbar interconnect 516, memory controllers 520-522, interfaces 540-542, and processor units 515a-515b include any suitable technology.

With the use of the non-blocking load unit 570, microprocessor 500 supports processing NBLD instructions for multiple processing units located both on-chip and off-chip via a network. Microprocessor 500 avoids stalls due to instructions with data dependencies on the NBLD instructions while accessing the NVRAM 560. Microprocessor 500 performs read operations asynchronously and executes a subroutine specified by the user space application without the overhead of a context switch or a protection ring.

It is noted that one or more of the above-described embodiments include software. In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
a memory; and
a processing unit;
wherein the processing unit is configured to:
  detect a non-blocking load instruction that includes an address of data stored in the memory and an identification of one or more instructions configured to operate on the data;
  convey a request to the memory for the data;
  process instructions that follow the non-blocking load instruction in program order, prior to fetching the one or more instructions configured to operate on the data;

fetch the one or more instructions for execution using the identification, responsive to detecting the data has returned from the memory; and retire the non-blocking load instruction after a successful commit, wherein the successful commit comprises verifying address translations are available for the data and the one or more instructions.

2. The computing system as recited in claim 1, wherein the one or more instructions form a subroutine and the identification of the one or more instructions is a pointer to the subroutine.

3. The computing system as recited in claim 2, wherein the load instruction further comprises a unique application specific identifier (ASID) corresponding to the subroutine that distinguishes the subroutine from other subroutines of other non-blocking load instructions.

4. The computing system as recited in claim 3, wherein the processing unit fetches the one or more instructions in further response determining the ASID corresponding to the subroutine is a same ASID as an ASID of a current process.

5. The computing system as recited in claim 1, wherein the memory is non-volatile memory.

6. The computing system as recited in claim 1, wherein the non-blocking load unit is further configured to convey the request for the data through a cache controller to ensure the request is a cache coherent read access.

7. The computing system as recited in claim 1, wherein the non-blocking load unit is further configured to identify a destination of the data returned from the memory is one of a cache location and a scratchpad memory location identified by either the processing unit or an operating system.

8. A method comprising:
    detecting, by a decoder, a non-blocking load instruction which indicates both an address of requested data and a pointer to a subroutine comprising one or more instructions configured to operate on the data;
    processing, by one or more processing stages, instructions that follow the non-blocking load instruction in program order, prior to fetching the one or more instructions configured to operate on the data;
    generating, by a load unit, a data read request with the address to send to lower-level memory;
    fetching, by a fetch unit, the subroutine responsive to detecting the requested data has returned from the lower-level memory; and
    retiring the non-blocking load instruction after a successful commit, wherein the successful commit comprises verifying address translations are available for the data and the one or more instructions.

9. The method as recited in claim 8, wherein the subroutine includes instructions dependent on the requested data.

10. The method as recited in claim 8, wherein the lower-level memory is non-volatile memory.

11. The method as recited in claim 8, further comprising sending the data read request with the address to the lower-level memory through a cache controller to ensure the data read request is a cache coherent read access.

12. The method as recited in claim 8, wherein the information comprises the address, the pointer and a unique application specific identifier (ASID) distinguishing the subroutine from other subroutines of other non-blocking load instructions.

13. The method as recited in claim 12, further comprising:
    receiving the pointer from the non-blocking load unit; and
    determining the ASID of the pointer is the same as an ASID of a current process.

14. The method as recited in claim 8, further comprising identifying a destination of the data returned from the lower-level memory is one of a cache location and a scratchpad memory location identified by either the processing unit or an operating system.

15. A non-blocking load unit comprising:
    an interface coupled to a lower-level memory via a cache controller to ensure data read requests are cache coherent read accesses;
    an array comprising a plurality of entries, wherein each entry is configured to store information corresponding to a non-blocking load instruction, said instruction including an indication of both an address of requested data and a pointer to a subroutine; and
    control circuitry configured to:
        generate a data read request with the address to send to the lower-level memory responsive to receiving information from an entry of the array;
        send the pointer to a processing unit for fetching the subroutine responsive to detecting the requested data has returned from the lower-level memory; and
        wherein the entry of the array is configured to store the address, the pointer, and a unique application specific identifier (ASID) distinguishing the subroutine from other subroutines of other non-blocking load instructions.

16. The non-blocking load unit as recited in claim 15, wherein the subroutine includes instructions dependent on the requested data.

17. The non-blocking load unit as recited in claim 16, wherein the control circuitry is further configured to identify a destination of the data returned from the lower-level memory is one of a cache location and a scratchpad memory location identified by either a processing unit or an operating system.

* * * * *